Reissued Nov. 22, 1932

Re. 18,667

UNITED STATES PATENT OFFICE

WILLIAM J. DENNIS, OF IOWA CITY, IOWA

VERMIFUGE AND INSECTICIDE

No Drawing. Original No. 1,621,240, dated March 15, 1927, Serial No. 632,358, filed April 16, 1923. Application for reissue filed February 25, 1929. Serial No. 342,656.

The object of my invention is to provide a vermifuge and insecticide useful for killing flies and other insects, parasites and vermin or other living things which may be killed by contact poisons.

A further object is to provide such a product which can be used as a powder or in solution as a spray or otherwise for plants, trees or animals or as a concentrated extract.

The invention consists of a compound obtained from the root or plant known in Peru as cube, (sometimes spelled cubi) which is found in Peru and other South American countries. While the exact botanical classification of the plant is not altogether certain, it is believed to be a species of the genus Lonchocarpus of the family Leguminosæ.

The compound is obtained by expressing or extracting from the root or plant.

A method for securing the compound may be as follows:

The roots or plants may be pulverized or divided into fine particles in a suitable grinder, and the resultant powder drawn off by an aspirator, as by a fan and delivered to a concentrator.

From the concentrator, the powder may be delivered to a container and there subjected to a suitable solvent, such as benzol alcohol, and so forth.

The solution is passed through a filter for removing the woody fibre and the product passing from the filter is the extract in solution, which is delivered to the evaporator.

After drying or evaporating, the concentrated extract may be removed for use as such.

The powder is a light straw color, odorless and tasteless.

For identification, the powder may be subjected to the action of concentrated sulphuric acid and dilute nitric acid, whereupon it gives a bright clear red color. By the addition of potassium hydroxide in nearly equal volume, a vigorous action is obtained, and the solution turns to a yellowish pink. A further addition of potassium hydroxide produces a stable brown colored solution.

The compound in the form of powder or dust may be used as an insecticide with talcum powder, cornstarch or other carrier. It is very effective against flies, roaches and other insects. It is my belief that the powder sets up an irritation of the breathing apparatus, which results in early death.

The compound can be used with water or with soap and water or other emulsifying agent, as a wash or spray for plants, animals or trees. It is effective against aphids, beetles, other insects and worms.

It can be used as an extract with alcohol for similar purposes, for instance as a wash for ticks on cattle.

As an alcoholic extract, tests show the solution to have slightly greater effectiveness when sprayed on the cotton aphid than nicotine sulphate. Experience shows that it is eight times as effective as similar derris extract.

The proportions of the compound and the carrier may be varied as desired for different purposes.

For certain purposes, it is desirable to use the alcoholic extract in a soap and water emulsification. A suitable solution for aphids can be made by using the extract from one third pound of powder in one hundred gallons of soap solution.

I claim as my invention:

1. An insecticide and vermifuge comprising ground cube root with the fibrous element removed.

2. An insecticide and vermifuge comprising an extract of cube.

3. An insecticide and vermifuge comprising an extract of cube root in a suitable organic solvent.

4. An insecticide and vermifuge comprising concentrated extract of cube and a carrying agent.

5. An insecticide and vermifuge comprising an extract of cube root in a suitable hydrocarbon solvent.

6. An insecticide and vermifuge according to claim 5 in which the hydrocarbon solvent used comprises benzol.

7. An insecticide and vermifuge comprising an extract of cube root in a suitable organic solvent emulsified in water.

WILLIAM J. DENNIS.